United States Patent
Ma et al.

(10) Patent No.: US 11,178,516 B2
(45) Date of Patent: Nov. 16, 2021

(54) INTRA-GROUP COMMUNICATION METHOD AND DEVICE, AND RESOURCE CONFIGURATION METHOD, DEVICE AND SYSTEM

(71) Applicant: XI'AN ZHONGXING NEW SOFTWARE CO., LTD., Xi'An (CN)

(72) Inventors: Zijiang Ma, Shenzhen (CN); Lin Chen, Shenzhen (CN); Ying Huang, Shenzhen (CN)

(73) Assignee: Xi'An Zhongxing New Software Co., Ltd., Xi'An (CN)

( * ) Notice: Subject to any disclaimer, the term of this patent is extended or adjusted under 35 U.S.C. 154(b) by 0 days.

(21) Appl. No.: 16/496,906

(22) PCT Filed: Mar. 13, 2018

(86) PCT No.: PCT/CN2018/078887
§ 371 (c)(1),
(2) Date: Sep. 23, 2019

(87) PCT Pub. No.: WO2018/171471
PCT Pub. Date: Sep. 27, 2018

(65) Prior Publication Data
US 2020/0021950 A1    Jan. 16, 2020

(30) Foreign Application Priority Data

Mar. 23, 2017    (CN) .......................... 201710179594.0

(51) Int. Cl.
*H04W 4/08*    (2009.01)
*H04W 4/46*    (2018.01)
(Continued)

(52) U.S. Cl.
CPC ............... *H04W 4/08* (2013.01); *H04W 4/46* (2018.02); *H04W 4/70* (2018.02); *H04W 8/005* (2013.01);
(Continued)

(58) Field of Classification Search
CPC .......... H04W 4/08; H04W 4/46; H04W 4/70; H04W 8/005; H04W 28/26;
(Continued)

(56) References Cited

U.S. PATENT DOCUMENTS 9,661,620 B2 *  5/2017  McNamara ........... H04L 5/0037
2009/0016317 A1 *  1/2009  Wu ....................... H04W 72/10
370/347
(Continued)

FOREIGN PATENT DOCUMENTS

CN    102246575    * 11/2011
CN    102246575 A    11/2011
(Continued)

OTHER PUBLICATIONS

International Search Report of Application No. PCT/CN2018/078887—4 pages (dated Jun. 4, 2018).

*Primary Examiner* — Dominic E Rego
(74) *Attorney, Agent, or Firm* — Knobbe Martens Olson & Bear LLP

(57) ABSTRACT

Provided are an intra-group communication method and apparatus, a resource configuration method, apparatus and system, and a storage medium. The intra-group communication method includes acquiring, by a group member in group, a platooning dedicated resource (PDR), where the PDR is used for intercommunication of all group members in the group; and performing, by the group member, the intercommunication after acquiring PDR configuration information related to the PDR.

16 Claims, 6 Drawing Sheets

(51) Int. Cl.
*H04W 4/70* (2018.01)
*H04W 8/00* (2009.01)
*H04W 28/26* (2009.01)
*H04W 72/00* (2009.01)
*H04W 72/04* (2009.01)
*H04W 72/12* (2009.01)
*H04W 92/18* (2009.01)

(52) U.S. Cl.
CPC ......... *H04W 28/26* (2013.01); *H04W 72/005* (2013.01); *H04W 72/048* (2013.01); *H04W 72/121* (2013.01); *H04W 92/18* (2013.01)

(58) Field of Classification Search
CPC ............. H04W 72/005; H04W 72/048; H04W 72/121; H04W 92/18
See application file for complete search history.

(56) References Cited

U.S. PATENT DOCUMENTS

2010/0238875 A1* 9/2010 Sung ..................... H04L 1/1854
370/329
2011/0151885 A1* 6/2011 Buyukkoc ......... H04W 72/1247
455/452.1
2011/0211439 A1* 9/2011 Manpuria ............. H04W 76/40
370/216
2012/0093098 A1 4/2012 Charbit et al.
2013/0343323 A1 12/2013 Kang et al.
2014/0016494 A1* 1/2014 Phan ..................... H04W 16/14
370/252
2014/0094183 A1 4/2014 Gao et al.
2014/0187255 A1* 7/2014 Dimou ................ H04W 72/082
455/452.2
2015/0131510 A1* 5/2015 Gilbert .................... H04W 4/06
370/312
2015/0208421 A1* 7/2015 Agiwal ............. H04W 36/0072
455/436
2018/0124836 A1* 5/2018 Hong .................. H04W 74/008

FOREIGN PATENT DOCUMENTS

CN 103843444 A 6/2014
WO 2015139282 A1 9/2015

* cited by examiner

INTRA-GROUP COMMUNICATION METHOD AND DEVICE, AND RESOURCE CONFIGURATION METHOD, DEVICE AND SYSTEM

CROSS-REFERENCES TO RELATED APPLICATIONS

This is a National stage application, filed under 37 U.S.C. 371, of International Patent Application NO. PCT/CN2018/078887, filed on Mar. 13, 2018, which claims the priority to a Chinese patent application No. 201710179594.0 filed on Mar. 23, 2017, disclosure of which are incorporated herein by reference in their entireties.

TECHNICAL FIELD

The present disclosure relates to the field of Vehicle to Everything (V2X) and, in particular, to an intra-group communication method and apparatus, and a resource configuration method, apparatus and system.

BACKGROUND

With the rapid development of economy and society, the rapid growth of China's automobile ownership and the frequent occurrence of road traffic accidents have become one of the important factors affecting the sense of public safety in China in recent years and road traffic safety has become one of the basic issues affecting social harmony and improving people's livelihood. China urgently needs to improve traffic safety in terms of technology, policy, education, etc. Among them, the improvement of a vehicle safety design is an important part. Technologies for improving vehicle safety are mainly divided into passive safety technologies and active safety technologies. The passive safety technologies are used to protect people and articles inside and outside the vehicle after an accident. The active safety technologies are used to prevent and reduce vehicle accidents and avoid people from injuries. The active safety technologies are the focus and trend of modern vehicle safety technology development. A survey report of the National Highway Traffic Safety Administration shows that 80% of road traffic accidents are caused by the driver's negligence within 3 seconds before the accident. An experiment of Daimler-Benz shows that if the driver is warned 0.5 seconds ahead, 60% of rear-end collision accidents can be avoided; if the driver is warned 1.5 seconds ahead and takes measures, 90% of the rear-end collision accidents can be avoided. It has become a new way for countries to try to solve road traffic safety problems by using a communication-based collision warning system, which employs advanced wireless cellular communication technologies to implement real-time information interactions between vehicles and between vehicles and roadside infrastructure, inform each other of the current status (including the position, speed, acceleration and traveling path of the vehicle) and the learned road environment information, cooperatively acquire road hazard conditions, and provide various collision warning information in time to prevent road traffic accidents.

Meanwhile, with the development of wireless multimedia traffic, people have an increasing demand for high data rates and user experience, which puts high requirements on the system capacity and coverage of a traditional cellular network. In another aspect, application scenarios such as public safety, social networks, close-range data sharing and local advertising have led to an increasing demand for understanding and communicating with people or things nearby, which may be called proximity services. The traditional cellular network centered on base stations has significant limitations in supporting high data rates and proximity services. Under this background, a device-to-device (D2D) technology, which represents a new development direction for future communication technologies, has emerged. The application of the D2D technology may reduce the burden of the cellular network, reduce the battery power consumption of a user equipment (UE), increase a data rate, and improve the robustness of network infrastructure, which satisfies the requirements for high data rate traffic and proximity services.

The D2D technology can be applied in licensed bands or unlicensed bands and allow multiple UEs supporting D2D functions (that is, D2D UEs) to perform direct discovery/direct communication with or without network infrastructure. There are mainly three application scenarios for the D2D technology.

A UE 1 and a UE 2 perform data interactions under the coverage of the cellular network and transmit user plane data without the network infrastructure. FIG. 1 is a schematic diagram of discovery or communication of a device pass-through system in the existing art. In a mode 1 shown in FIG. 1, UEs perform relay transmission in a weak coverage area/in non-coverage area. In a mode 2 shown in FIG. 1, a UE 4 with a poor signal quality is allowed to communicate with the network through a nearby UE 3 with network coverage, thereby helping an operator to expand coverage and increase capacity.

When the cellular network cannot work properly in the case of an earthquake or an emergency, direct communication between devices is allowed. In a mode 3 shown in FIG. 1, one-hop or multi-hop data communication is performed between a UE 5, a UE 6 and a UE 7 without the network infrastructure on both a control plane and a user plane.

The D2D technology generally includes a D2D discovery technology and a D2D communication technology. The D2D discovery technology refers to a technology for deciding/determining whether a first UE is adjacent to a second UE. Generally, the D2D UEs may discover each other by transmitting or receiving a discovery signal or discovery information. The D2D communication technology refers to a technology in which the D2D UEs may perform direct communication without the network infrastructure for part or all of communication data.

Based on the above characteristics and advantages of the D2D technology, cellular wireless communication and the D2D technology are likely to be used in the existing art to implement V2X applications to support main communication scenarios including instant communication and vehicle warnings. The vehicle warnings may include collision warnings, lane change warnings, etc., which has very high requirements on a delay and cannot be implemented by the D2D technology.

FIG. 2 is a schematic diagram of vehicle traffic in the existing art. As shown in FIG. 2, in V2X communication, the direct communication between vehicles (Vehicle to Vehicle (V2V) communication) in many scenarios needs to satisfy the requirements of a low delay and high reliability. For example, if a distance between two vehicles (for example, a vehicle A and a vehicle B) is too close, attention needs to be paid to traffic safety between the two vehicles. If the vehicle A first reports its own position/speed and the like to the network and then the network notifies the vehicle B, the vehicle B obtains the position/speed and the like of the vehicle A with a delay so that the vehicle B cannot quickly avoid the vehicle A.

FIG. 3 is a schematic diagram of V2X communication in the existing art. As shown in FIG. 3, in the V2X communication, the communication between the vehicle and the network is referred to as Vehicle to Infrastructure (V2I) communication. It is to be noted that the V2I communication is referred to as V2R communication, where R represents a Radio Side unit (RSU). The V2I/V2R communication refers to the communication between the vehicle and the network. The network can be the RSU, infrastructure, an evolved NodeB (eNB), a core network, a relay, a V2X server or the like.

Therefore, in these application scenarios related to vehicle safety, it is appropriate to use the V2V communication. Furthermore, the D2D technology defined by the third generation partnership project (3GPP) and a PC5 interface may be adopted in the V2V communication. To implement the V2V communication, each vehicle supporting the V2V communication needs to obtain a resource required for communication (a physical resource such as a communication frequency and a time slot). When the D2D technology defined by 3GPP is adopted in the V2V communication, the resource required for the V2V communication can be obtained in a contention manner. For example, a vehicle which obtains the resource first can use the resource first. However, in this manner, resource congestion and collisions may occur in an area with many vehicles. For example, with a resource block allocated in advance, multiple vehicles contend for the same resource (such as the same frequency resource and time slot resource) so that all the vehicles cannot use the resource and information of these vehicles cannot be transmitted out. Therefore, in the V2V communication, if the vehicles obtain a resource in a resource pool in the contention manner, it is easy to cause collisions and these vehicles cannot transmit the information out in time.

For the above reason, if there are many vehicles in an area, to prevent these vehicles from contending for the resource to avoid congestion, the network can allocate and schedule resources for each vehicle so that multiple vehicles will not use the same resource in the V2V communication and the information of each vehicle can be transmitted out in time. On the one hand, the V2V communication is required in the V2X application scenarios related to vehicle safety. On the other hand, the resource collisions in the V2V communication need to be avoided in a dense area of vehicles.

A platooning includes a platooning manager and at least one platooning member. A wireless resource required by the platooning includes a wireless resource for the communication between the platooning and the outside and a wireless resource for the communication inside the platooning. The platooning manager is responsible for the information interactions between the platooning and the outside. For example, the platooning manager is responsible for information interactions between the platooning and the RSU. The platooning manager collects status information of the platooning and sends the information to the RSU. The RSU also transmits to the platooning manager road condition information near or away from the platooning and the platooning manager forwards the road condition information to the platooning member. A delay requirement is not in a high demand in the communication between the platooning manager and the RSU which generally has a large data packet. A V2I mode is adopted in the communication between the platooning manager and the RSU. When the RSU is an eNB type RSU, a Uu interface between the network and the UE is adopted in the V2I mode. When the RSU is a UE type RSU, a PC5 interface which is a D2D interface is adopted in the V2I mode. In addition to the information interactions between the platooning and the external RSU, the platooning manager also performs the direct communication between vehicles inside the platooning (referred to as the V2V communications). The platooning manager can collect the status information of the platooning member through the V2V communication and transmit the status information to the RSU through the V2I communication. The platooning manager forwards road condition information from the RSU to the platooning member through the V2V communication. In short, the platooning manager undertakes the V2I communication with the external RSU and the V2V communication with the platooning member inside the platooning. The platooning manager and all the platooning members in the platooning perform the V2V communication. Through the V2V communication, the platooning member transmits its own status information to the platooning manager and other platooning members with a data packet of a variable size under a generally high delay requirement.

In short, the communication of the platooning includes the communication inside the platooning (the communication between all the platooning members) and the communication between the platooning and the outside (the platooning interacts the status information of the platooning and surrounding environment information with the outside). The former is mainly the V2V communication with a high delay requirement and a large data packet (sometimes the delay requirement is low and the data packet is small). The latter is mainly the V2I communication between the platooning manager and the RSU with a low delay requirement and a large data packet (sometimes the data packet is small). The latter also includes the V2V communication for the platooning to broadcast some status information of the platooning to nearby vehicles to prevent the nearby vehicles from affecting safe driving of the platooning.

The platooning members of the platooning are very close to each other and have the same movement trajectory at present and in future. The platooning can move like a train. To maintain the distance between vehicles of the platooning, the platooning members need to interact with each other the status information such as a speed, a movement direction, a movement trajectory, braking and acceleration. After the platooning is constructed, the distance between vehicles in the platooning can be reduced, fuel consumption can be reduced, and the number of drivers required can be reduced. In the platooning, generally a first vehicle is responsible for the driving of the whole platooning. That is, the first vehicle needs to collect the status information (position, direction and speed) of each vehicle and provide a driving instruction (direction, speed, braking, etc.) for each platooning member. Therefore, frequent, highly reliable and low-delay V2V communication is required between the platooning members and between each platooning member and the first vehicle.

Currently, the problem is that a dedicated resource is not designed for the V2V communication between platooning members inside the platooning in the existing art. If the network dynamically allocates or allocates resources, the burden of signaling interactions between the network and the vehicle will be greatly increased and the V2V communication between platooning members will have a high delay.

SUMMARY

Embodiments of the present disclosure provide an intra-group communication method and apparatus, and a resource configuration method, apparatus and system.

An embodiment of the present disclosure provides an intra-group communication method. The method includes steps described below. Group members in the group acquire a platooning dedicated resource (PDR), where the PDR is used for intercommunication of all members in the group. The group members perform the intercommunication after acquiring PDR configuration information related to the PDR. The all members include the group members.

In the preceding solution, the method further includes a step described below. On condition that the group members are located within a coverage range of a network side device or a resource member in the group is located within the coverage range of the network side device, the group members acquire the PDR transmitted by the network side device and/or the resource member. On condition that the resource member is located out of the coverage range of the network side device or the all members are located out of the coverage range of the network side device, the group members acquire the PDR transmitted by the resource member. The resource member is one of the all members in the group which is configured to transmit to the network side device a configuration request for requesting the PDR and configure the PDR for the group members in the group.

In the preceding solution, acquiring the PDR configuration information includes a step described below. On condition that the group members are located within the coverage range of the network side device or the resource member is located within the coverage range of the network side device, the group members acquire the PDR configuration information transmitted by the network side device and/or the resource member in the group. On condition that the resource member is located out of the coverage range of the network side device or the all members are located out of the coverage range of the network side device, the group members acquire the PDR configuration information transmitted by the resource member. The resource member is further configured to transmit to the network side device a configuration request for requesting the PDR configuration information and transmit the PDR configuration information to the group members in the group.

In the preceding solution, the PDR configuration information comprises at least one of: a resource position of the PDR, a resource size of the PDR, a resource duration of the PDR or a resource starting time of the PDR.

Another embodiment of the present disclosure provides a resource configuration method of a network side device. The method includes steps described below. The network side device configures a platooning dedicated resource (PDR) for group members in a group, wherein the PDR is used for intercommunication of all members in the group. The network side device transmits PDR configuration information related to the PDR to the group members. The all members include the group members.

In the preceding solution, the method further includes a step described below. The network side device actively configures the PDR for the group and transmits the PDR configuration information to the group. Alternatively, the network side device receives a configuration request transmitted by a resource member in the group and configures, in response to the configuration request, the PDR for the group members and transmits the PDR configuration information to the group members; wherein the resource member is one of the all members in the group capable of transmitting the configuration request to the network side device and configuring the PDR for and transmitting the PDR configuration information to the group members in the group.

In the preceding solution, the method further includes steps described below. The network side device determines whether the resource member is located within a coverage range of the network side device; and in response to determining that the resource member is located within the coverage range of the network side device, transmitting, by the network side device, the PDR and the PDR configuration information to the resource member.

In the preceding solution, the method further includes a step described below. In response to determining that the resource member is located out of the coverage range of the network side device, the network side device cancels a transmission of the PDR and the PDR configuration information to the resource member. Alternatively, in response to determining that the resource member is located out of the coverage range of the network side device, the network side device determines whether a backup resource member preset in the group is located within the coverage range of the network side device; and in response to determining that the backup resource member is located within the coverage range of the network side device, the network side device transmits the PDR and the PDR configuration information to the resource member.

In the preceding solution, the step in which the network side device transmits the PDR configuration information to the resource member includes that the network side device configures a resource for carrying the PDR configuration information for the resource member so that the resource member forwards the PDR configuration information with the resource.

In the preceding solution, the network side device configures the PDR for the group members through updating, where a condition for triggering the updating includes at least one of following manners: the network side device detects that a position area where the group members are located is updated from a first area to a second area; the network side device detects that a quality value indicating a quality of the PDR of the group members is less than a preset quality threshold; or the network side device acquires group member information and environment information reported by the group members and determines that the group member information and the environment information satisfy a preset trigger condition.

In the preceding solution, after the network side device configures the PDR for the group members, the method further includes a step described below. The network side device broadcasts a resource situation of the configured PDR. Alternatively, the network side device instructs the group members to broadcast the resource situation of the configured PDR.

In the preceding solution, the PDR configuration information includes at least one of: a resource position of the PDR, a resource size of the PDR, a resource duration of the PDR or a resource starting time of the PDR.

Yet another embodiment of the present disclosure provides an intra-group resource configuration method. The method includes steps described below. A resource member in the group configures a platooning dedicated resource (PDR) for group members in the group, the PDR is used for intercommunication of all members in the group. The resource member transmits PDR configuration information related to the PDR to the group members. The all members include the group members.

In the preceding solution, before the resource member configures the PDR for the group members, the method further includes steps described below. The resource member determines whether a group member in the group is located out of a coverage range of a network side device. In response to determining that the group member in the group is located out of the coverage range of the network side device, the resource member configures the PDR for the group members and transmits the PDR configuration information to the group members.

In the preceding solution, on condition that the resource member determines that the resource member is located within the coverage range of the network side device, the method includes steps described below. The resource member transmits PDR request information to the network side device. The resource member receives the PDR and the PDR configuration information transmitted by the network side device according to the PDR request information. The resource member configures the PDR transmitted by the network side device for the group members and transmitting the PDR configuration information transmitted by the network side device to the group members.

In the preceding solution, on condition that the resource member determines that the resource member is located out of the coverage range of the network side device, the method includes a step described below. The resource member determines whether a backup resource member in the group is located within the coverage range of the network side device; in response to determining that the backup resource member is located within the coverage range of the network side device, the resource member instructs the backup resource member to replace the resource member as the resource member to configure the PDR for and transmit the PDR configuration information to the group members. Alternatively, the resource member configures the PDR of the resource member for the group members and transmitting the PDR configuration information of the resource member to the group members.

In the preceding solution, the method further includes a step described below. The resource member receives a resource for carrying the PDR configuration information and configured by the network side device, and transmits the PDR configuration information to the group members with the resource.

In the preceding solution, the step in which the resource member configures the PDR for the group members further includes a step described below. The resource member allocates the PDR to the group members. Alternatively, the resource member updates the PDR for the group members.

In the preceding solution, on condition that the resource member allocates the PDR to the group members, the method includes that the resource member allocates the PDR to the group members according to group member information and/or a preset configuration manner.

In the preceding solution, the group member information includes at least: a number of the group members, speed information of the group members and environment information of the group members; and a preset configuration manner is a manner for allocating the PDR which is predetermined by the group for the group members.

In the preceding solution, a condition for triggering the updating includes at least one of the following: the resource member detects that a position area where the group members are located is updated from a first area to a second area; the resource member detects that the PDR which the group members needs to acquire reaches a preset acquisition threshold; or the resource member detects that a quality value indicating a quality of the PDR of the group members is less than a preset quality threshold.

In the preceding solution, after the resource member configures the PDR for the group members, the method further includes a step described below. The resource member broadcasts a resource situation of the configured PDR. Alternatively, the resource member instructs the group members to broadcast the resource situation of the configured PDR.

In the preceding solution, the PDR configuration information includes at least one of: a resource position of the PDR, a resource size of the PDR, a resource duration of the PDR or a resource starting time of the PDR.

Another embodiment of the present disclosure provides an intra-group communication apparatus including an acquisition module and a communication module. The acquisition module is configured to acquire a platooning dedicated resource (PDR), wherein the PDR is used for intercommunication of all members in group. The communication module is configured to perform the intercommunication after PDR configuration information related to the PDR is acquired. The all members include the group members.

In the preceding solution, the acquisition module is further configured to: on condition that the group members is located within a coverage range of a network side device or a resource member in the group is located within the coverage range of the network side device, acquire the PDR and the PDR configuration information transmitted by the network side device and/or the resource member in the group; or on condition that the resource member is located out of the coverage range of the network side device or the all members are located out of the coverage range of the network side device, acquire the PDR and the PDR configuration information transmitted by the resource member. The resource member is one of the all members in the group which is configured to transmit to the network side device a configuration request for requesting the PDR and a configuration request for requesting the PDR configuration information and configure the PDR for and transmit the PDR configuration information to the group members in the group.

Another embodiment of the present disclosure provides a resource configuration apparatus disposed in a network side device. The apparatus includes a resource processing module and a transmitting module. The resource processing module is configured to configure a platooning dedicated resource (PDR) for group members in a group, wherein the PDR is used for intercommunication of all members in the group. The transmitting module is configured to transmit PDR configuration information related to the PDR to the group members. The all members include the group members.

In the preceding solution, the resource processing module is configured to actively configure the PDR for and transmit the PDR configuration information to the group; or receive a configuration request transmitted by a resource member in the group and configure, in response to the configuration request, the PDR for and transmit the PDR configuration information to the group members; the resource member is one of the all members in the group capable of transmitting the configuration request to the network side device and configuring the PDR for and transmitting the PDR configuration information to the group members in the group.

In the preceding solution, the apparatus further includes a determining module, configured to determine whether the resource member is located within a coverage range of the network side device; in response to determining that the resource member is located within the coverage range of the network side device, transmit the PDR and the PDR configuration information to the resource member.

In the preceding solution, the apparatus further includes a broadcast module, configured to broadcast a resource situation of the configured PDR, or instruct the group members to broadcast the resource situation of the configured PDR.

Yet another embodiment of the present disclosure provides a resource configuration apparatus disposed in a resource member in the group. The apparatus includes a resource processing module and a transmitting module. The resource processing module is configured to configure a platooning dedicated resource (PDR) for the group members in the group, the PDR is used for intercommunication of all members in the group. The transmitting module is configured to transmit PDR configuration information related to the PDR to the group members. The all members include the group members.

In the preceding solution, the apparatus further includes a determining module, configured to determine whether a group member in the group is located out of a coverage range of a network side device; and in response to determining that the group member in the group is located out of the coverage range of the network side device, trigger the transmitting module to configure the PDR for and transmit the PDR configuration information to the group members.

In the preceding solution, the apparatus further includes a request module, a receiving module and a forwarding module. The request module is configured to transmit PDR request information to the network side device. The receiving module is configured to receive the PDR and the PDR configuration information transmitted by the network side device according to the PDR request information. The forwarding module is configured to configure the PDR transmitted by the network side device for the group members and transmit the PDR configuration information transmitted by the network side device to the group members.

In the preceding solution, the resource processing module is further configured to allocate the PDR to the group members according to group member information and/or a preset configuration manner.

In the preceding solution, the apparatus further includes a broadcast module, configured to instruct the group members to broadcast a resource situation of the configured PDR.

Another embodiment of the present disclosure further provides a storage medium. The storage medium is configured to store program codes for executing steps described below.

In S1, group members in a group acquire a PDR, where the PDR is used for intercommunication of all members in the group.

In S2, the group members perform the intercommunication after acquiring PDR configuration information related to the PDR. The all members include the group members.

Another embodiment of the present disclosure further provides a storage medium. The storage medium is configured to store program codes for executing steps described below.

In S1, a network side device configures a platooning dedicated resource (PDR) for group members in a group, wherein the PDR is used for intercommunication of all members in the group. The all members include the group members.

In S2, the network side device transmits PDR configuration information related to the PDR to the group members.

Another embodiment of the present disclosure further provides a storage medium. The storage medium is configured to store program codes for executing steps described below.

In S1, a resource member in the group configures a PDR for group members in the group, where the PDR is used for intercommunication of all members in the group. The all members include the group members.

In S2, the resource member transmits PDR configuration information related to the PDR to the other group members.

Another embodiment of the present disclosure provides a processor configured to execute program codes of steps described below.

In S1, a PDR is configured for group members in a group, where the PDR is used for intercommunication of all members in the group. The all members include the group members.

In S2, PDR configuration information related to the PDR is transmitted to the group members.

Another embodiment of the present disclosure provides a processor configured to execute program codes of steps described below.

In S1, a PDR is configured for group members in a group, where the PDR is used for intercommunication of all members in the group. The all members include the group members.

In S2, PDR configuration information related to the PDR is transmitted to the group members.

Another embodiment of the present disclosure provides a processor configured to execute program code of steps described below.

In S1, a PDR is configured for group members in the group, where the PDR is used for intercommunication of all members in the group. The all members include the group members.

In S2, a resource member transmits PDR configuration information related to the PDR to the group members.

Yet another embodiment of the present disclosure provides a resource configuration system including a network side device and group members. The network side device is configured to configure a PDR for the group members in the group, and transmit PDR configuration information related to the PDR to the group members; where the PDR is used for intercommunication of all members in the group. The group members are configured to receive the PDR and the PDR configuration information configured by the network side device.

Another embodiment of the present disclosure provides a resource configuration system including a resource member and group members. The resource member in the group is configured to configure a PDR for the group members in the group, and transmit PDR configuration information related to the PDR to the group members; where the PDR is used for intercommunication of all members in the group. The group members in the group are configured to receive the PDR configured by the resource member and the PDR configuration information transmitted by the resource member.

When the present disclosure is used, in V2V communication, the network side device or the resource member in the group configures the PDR used for intra-group communication for the group members in the group and transmits attribute information capable of indicating the PDR to the group members configured with the PDR. Therefore, the present disclosure may solve the problem in the existing art of a significantly increased burden of signaling interactions between a network and a vehicle (no burden of signaling interactions between the network and the vehicle increased due to the V2V communication between platooning members in the platooning) and a high delay of V2V communication between platooning members because the network dynamically allocates or schedules a resource, simplify a resource configuration between the platooning members and supports a mobility of the platooning members in different position areas.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure. In the drawings.

DETAILED DESCRIPTION

Hereinafter the present disclosure will be described in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Embodiment 1

Figure 1:
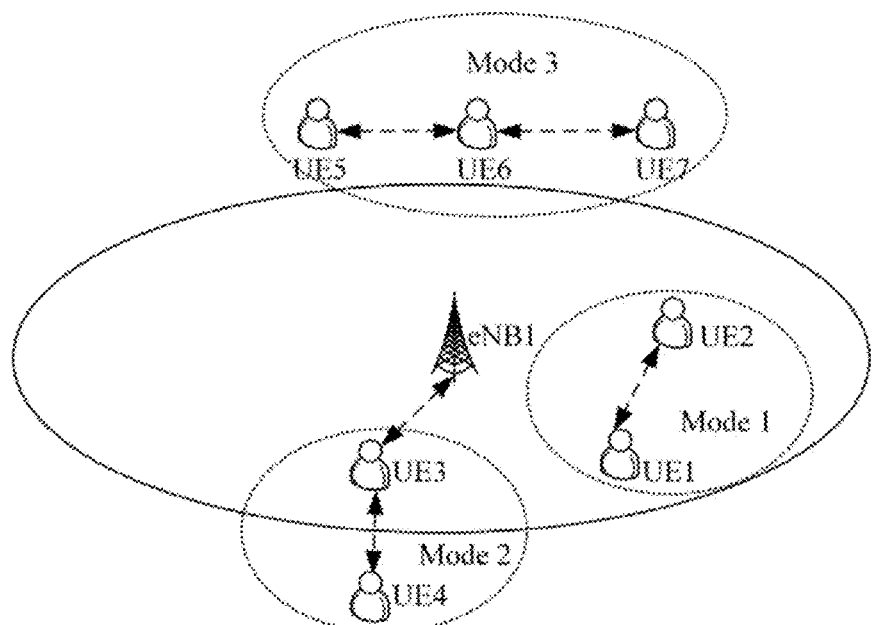
FIG. 1 is a schematic diagram of discovery or communication of a device pass-through system in the existing art.
Figure 2:
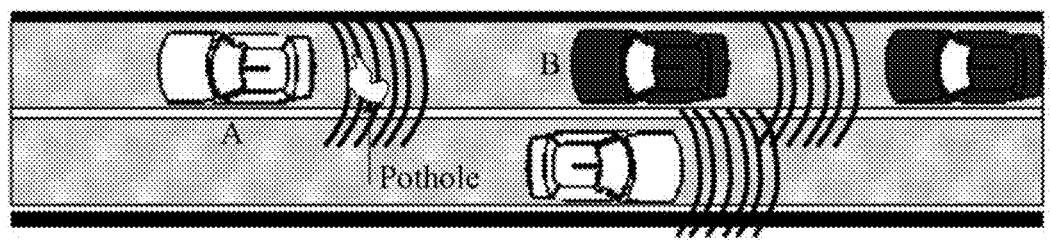
FIG. 2 is a schematic diagram of vehicle traffic in the existing art.
Figure 3:
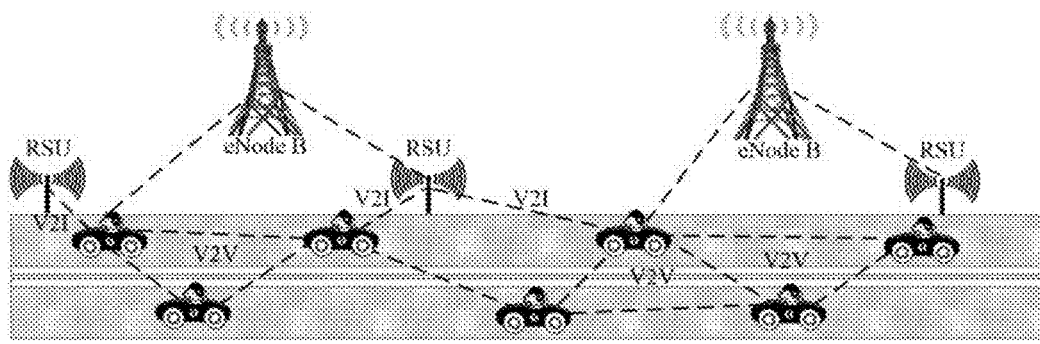
FIG. 3 is a schematic diagram of V2X communication in the existing art.
Figure 4:
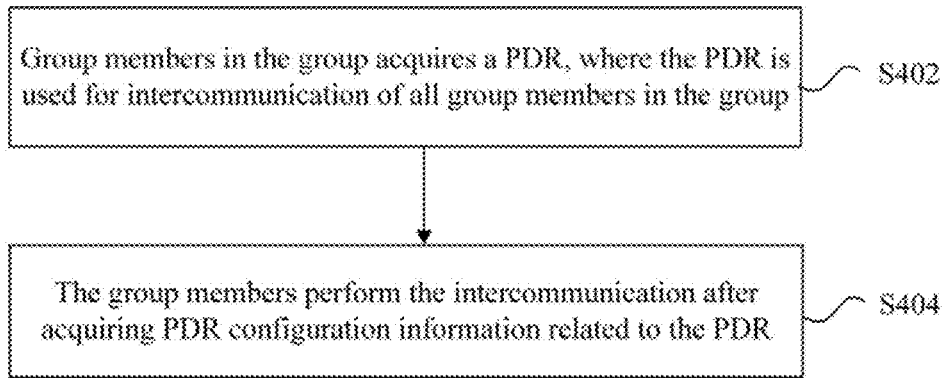
FIG. 4 is a flowchart of an intra-group communication method according to an embodiment of the present disclosure.

This embodiment provides an intra-group communication method. FIG. 4 is a flowchart of an intra-group communication method according to an embodiment of the present disclosure. As shown in FIG. 4, the method includes steps described below.

In S402, group members in the group acquire a PDR, where the PDR is used for intercommunication of all the group members in the group.

In S404, the group members perform the intercommunication after acquiring PDR configuration information related to the PDR.

In an embodiment, when the group members are located within a coverage range of a network side device or a resource member in the group is located within the coverage range of the network side device e, the group members acquire the PDR transmitted by the network side device and/or the resource member (which means that the network side device and/or the resource member allocate the PDR). When the resource member is located out of the coverage range of the network side device or all the group members are located out of the coverage range of the network side device, the group members acquire the PDR transmitted by the resource member (which means that the resource member allocates the PDR). The resource member is a group member in the group which is configured to transmit to the network side device a configuration request for requesting the PDR and configure the PDR for other group members in the group.

In an embodiment, when the group members are located within the coverage range of the network side device or the resource member is located within the coverage range of the network side device, the group member acquire the PDR configuration information transmitted by the network side device and/or the resource member in the group. When the resource member is located out of the coverage range of the network side device or all the group members are located out of the coverage range of the network side device, the group member acquires the PDR configuration information transmitted by the resource member. The resource member is further configured to transmit to the network side device a configuration request for requesting the PDR configuration information and transmit the PDR configuration information to the other group member in the group.

In an embodiment, the PDR configuration information includes at least one of: a resource position of the PDR, a resource size of the PDR, a resource duration of the PDR or a resource starting time of the PDR.

Embodiment 2

Figure 5:
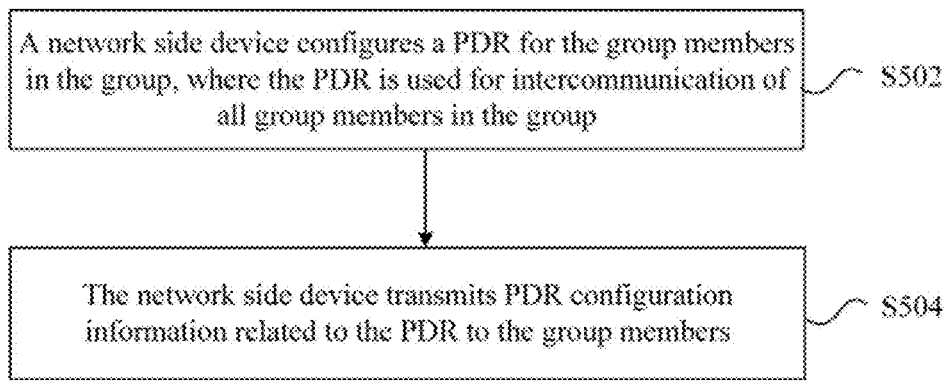
FIG. 5 is a flowchart of a resource configuration method of a network side device according to an embodiment of the present disclosure.

This embodiment provides a resource configuration method of a network side device. FIG. 5 is a flowchart of a resource configuration method of a network side device according to an embodiment of the present invention. As shown in FIG. 5, the method includes steps described below.

In step S502, the network side device configures a PDR for group members in a group, the PDR is used for intercommunication of all the group members in the group.

In step S504, the network side device transmits PDR configuration information related to the PDR to the group members.

It is to be noted that in this embodiment, when the group member communicate with the network side device or other group members (not in the group), the group member does not perform communication with the PDR. However, when the group member communicates with the other group members in the group, the group member performs communication with the PDR. In other words, the PDR is exclusively used for the communication between different group members in the same group.

It is to be noted that in this embodiment, if the group member cannot receive the PDR configured for the group member and the PDR configuration information transmitted to the group members, or cannot communicate with the other group members with the PDR, the group member will be considered to be not in the group.

It is to be noted that the network side device allocates the PDR to the group members through a Uu interface used for communication between the network side device and the group members within a coverage range of the network side device. A network of the network side device refers to a wireless network which may allocate a wireless resource to the group, such as a radio access network (RAN). Specifically, the network side device may be, but is not limited to, a base station such as an eNB, a next-generation NodeB (gNB) or a Long Term evolution (LTE) eNB.

In an embodiment, the network side device actively configures the PDR for and transmits the PDR configuration information to the group members. For example, when all the group members are located within the coverage range of the network side device, to save resource transmission time and reduce consumption, the network side device directly configures the PDR for and transmits the PDR configuration information to each group member in the group.

In an embodiment, the network side device receives a configuration request transmitted by a resource member in the group and configures the PDR for and transmits the PDR configuration information to the group members in response to the configuration request. The resource member is a group member in the group capable of transmitting the configuration request to the network side device and configuring the PDR for and transmitting the PDR configuration information to the other group members in the group. For example, some group members in the group are located within the range of the network side device and the other group members are located out of the range of the network side device. Meanwhile, the group members located out of the range of the network side device are likely to not enter into the range of the network side device. Therefore, in this case, the network side device cannot directly allocate or update the resource for the group members which cannot enter into the coverage range of the network side device. To normally implement the communication within the group, the resource member located within the range of the network side device acquires the PDR by transmitting the configuration request to the network side device, and allocated the acquired PDR to the group members in the group which cannot directly acquire the PDR from the network side device.

In an embodiment, before the network side device configures the PDR for the group, the network side device determines whether the resource member is located within the coverage range of the network side device; and in response to determining that the resource member is located within the coverage range of the network side device, the network side device transmits the PDR and the PDR configuration information to the resource member (which means that the network side device allocates the PDR and then transmits the PDR configuration information of the allocated PDR to the resource member (through a signaling flow)).

It is to be noted that, as long as the resource member is located within the coverage range of the network side device, the network side device may perform a configuration of the PDR and reception of the PDR configuration information in the group through the resource member. Therefore, in the preceding determining manner, resources occupied by the network side device can be saved while the PDR is configured and the PDR configuration information is transmitted.

In an embodiment, in response to determining that the resource member is located out of the coverage range of the network side device, the network side device cancels transmission of the PDR and the PDR configuration information to the resource member. Alternatively, in response to determining that the resource member is located out of the coverage range of the network side device, the network side device determines whether a standby resource member preset in the group is located within the coverage range of the network side device; and in response to determining that the standby resource member is located within the coverage range of the network side device, the network side device transmits the PDR and the PDR configuration information to the backup resource member.

In an embodiment, the resource member may be a manager which manages all the group members in the group, for example, a group member at a leading position of the group. Of course, a group member at another position of the group may also be taken as the resource member. It is to be noted that the resource member needs to transmit the configuration request to the network side device within the coverage range of the network side device. If the resource member detects that the resource member has not entered into the coverage range of the network side device, the resource member may instruct a group member capable of entering into the coverage range of the network side device in the p1 group to serve as a new resource member. Alternatively, the group may also determine a preset set of standby resource members has a group member which has entered into the coverage range of the network side device. If the group member which has entered into the coverage range of the network side device exists, the group member which has entered into the coverage range of the network side device in the set of standby resource members is indicated as the new resource member to replace the original resource member. The original resource member stops functioning as the resource member and serves as a common group member in the group.

In an embodiment, the network side device configures the PDR for the group members in the following manner: the network side device allocates the PDR to the group member or the network side device updates the PDR for the group.

It is to be noted that the network side device allocates the PDR to the group members, which means that the network side device allocates the corresponding PDR to the group members in the group which has not implemented intragroup communication with the PDR.

That the network side device updates the PDR for the group means that the network side device updates the PDR of each group member which has implemented the intragroup communication with the allocated PDR in the group. Specifically, a condition for triggering updating of the PDR includes at least one of conditions described below.

(1) The resource member detects that a position area where the group members are located is updated from a first area to a second area. For example, if the network side device detects that the group members move from a sparsely populated mountain road to a densely populated village, the network side device needs to allocate more PDRs to the group members in the village for communication. Conversely, if the group members move from the densely populated village to the sparsely populated mountain road, the network side device no longer needs to allocate more resources to the group members and reduces resources allocated to the group to save resources.

(2) The network side device detects that a quality value indicating a quality of the PDR of the group members is less than a preset quality threshold. For example, the network side device detects that currently a value of a network signal of the position of the group members is −90 dbm which is less than a normal value range (generally from −40 dbm to −60 dbm). In this case, the network side device needs to allocate more PDRs to the group member to ensure the normal communication between group members.

(3) The network side device acquires group member information and environment information reported by the group members and determines that the group member information and the environment information satisfy a preset trigger condition.

Specifically, the group member information includes at least a speed at which the group member moves, a number of group members in the group and a distance between group members in the group, but it is not limited thereto.

For example, if the speed of the group member is within a range from 0km/h to 80 km/h (but it is not limited thereto), the network side device is not triggered to update the PDR. When the speed of the group member is greater than 80 km/h, the network side device is triggered to update the PDR. The greater the speed of the group member, the more PDR resources the network side device needs to allocated to the group member.

It is to be noted the update of the PDR is also applicable to other group member information. For example, the greater the number of group members in the group, the more PDR resources the network side device needs to allocated to the group members. The greater the distance between group members in the group, the more PDR resources the network side device needs to allocated to the group members. Details are not described herein.

Specifically, the environment information includes at least a road condition of the position of the current group member and weather information at the position, but it is not limited thereto. For example, if the position of the current group member is in bad weather (for example, haze), the network side device needs to provide the group member with more PDR resources for communication.

It is to be noted that in a practical update scenario, the network side device needs to comprehensively consider the group member information and the environment information instead of considering a single condition. For example, if the group member moves from the sparsely populated mountain road to the densely populated village, the speed of the group members significantly decreases, and a new group member enters into the group, the network side device needs to consider all the three situations before the network side device confirms whether to update the PDR and whether to provide more resources or reduce the resources provided for the group member when updating the PDR.

In an embodiment, the PDR configuration information includes at least one of: a resource position of the PDR, a resource size of the PDR, a resource duration of the PDR or a resource starting time of the PDR.

It is to be noted that the resource position of the PDR refers to a position identifier of the PDR in at least one of time domain, frequency domain or code domain. Specifically, the position can be used for indicating the PDR may be acquired in which time domain, frequency domain and code domain. The resource size of the PDR refers to a resource capacity of the PDR, such as a number of bytes or a number of bits.

In an embodiment, a radio resource control (RRC) message transmitted by the network side device to the resource member through a Uu interface includes not only the PDR configuration information (the PDR is used for V2V communication between group members) but also a resource for carrying the PDR configuration information. The resource member transmits the PDR configuration information to the group member with the resource. Both the resource and the PDR are used for the V2V communication between group members and transmitted through a PC5 interface.

In an embodiment, to prevent the resource from being used by a network or other group members not in the group, after the network side device transmits the PDR to the group members, the network side device may broadcast a resource situation of the configured PDR. If the group members are located out of an range of a base station, the network side device may also instruct the group members in advance to broadcast the resource situation of the configured PDR.

In an embodiment, this embodiment further provides scenarios below to facilitate the understanding of the technical solution described in this embodiment.

Scenario 1

Figure 6:
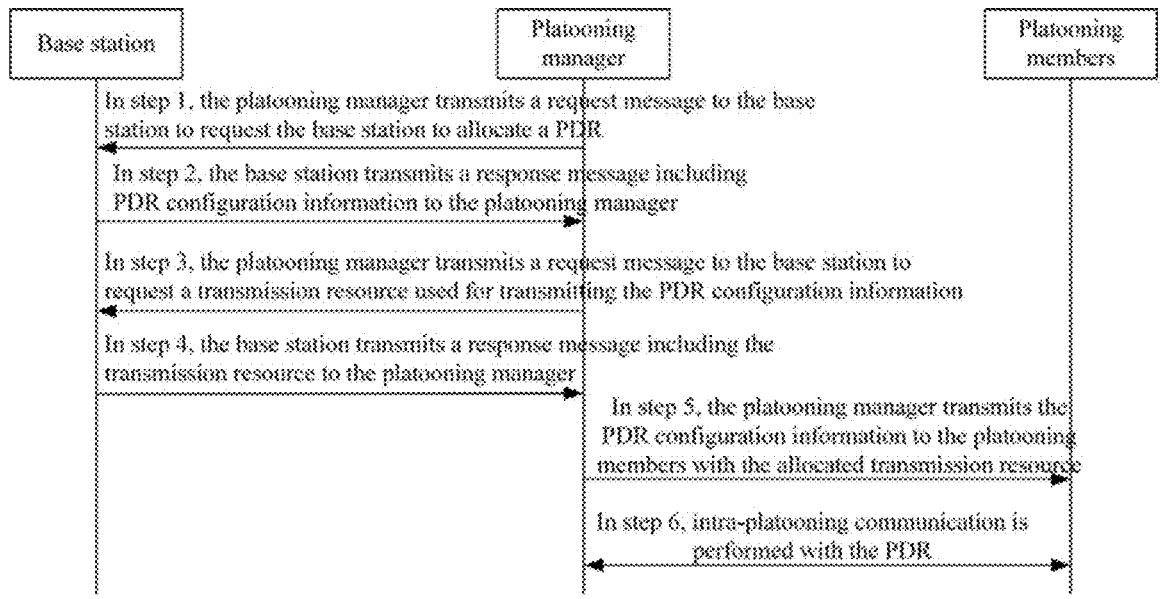
FIG. 6 is a flowchart illustrating a scenario 1 of a resource configuration method of a network side device according to an embodiment of the present disclosure.

FIG. 6 is a flowchart illustrating a scenario 1 of a resource configuration method of a network side device according to an embodiment of the present disclosure. As shown in FIG. 6, the network side device is embodied as the base station. The group is embodied as a platooning. The resource member is disposed at a leading position of the platooning, that is, a platooning manager is the resource member.

A specific implementation flow is described below.

In step 1, the platooning manager transmits a request message to the base station through the Uu interface to request the base station to configure the PDR for the platooning.

It is to be noted that the request message may be a new RRC message transmitted by the platooning manager to the base station. The new RRC message is PDR allocation request information or a side link UE information message in the existing art. The RRC message includes a corresponding information unit requesting the PDR to be configured.

In step 2, the base station transmits a response message to the platooning manager through the Uu interface.

The response message may be PDR allocation response information or an RRC connection reconfiguration message transmitted by the base station to the platooning manager. The message includes a corresponding information unit for configuring the PDR.

In step 3, the platooning manager requests a transmission resource from the base station through the Uu interface. The platooning manager forwards the PDR configuration information to the platooning members with the transmission resource.

In this step, the transmission resource requested by the platooning manager from the base station is different from the PDR, but is used for carrying the PDR configuration information.

In step 4, the base station configured the transmission resource for the platooning manager through the Uu interface and then the platooning manager forwards the PDR configuration information to the platooning members with the transmission resource.

In Step 5, the platooning manager transmits the PDR configuration information to the platooning member with the configured transmission resource.

A message includes one or more of a resource size, a duration, frequency channel number information and the like. Since the platooning manager transmits a notification message to all the platooning members, the platooning manager may transmit the notification message in a broadcast mode. The message is generally a V2V message and may be transmitted through the PC5 interface.

In step 6, the other platooning member acquires the PDR configuration information, and then the platooning manager and the other platooning member in the platooning perform intra-platooning communication with the PDR.

In step 7, the base station or the platooning members broadcast that the configured PDR is occupied to the outside.

In step 7, once the PDR is configured to a certain platooning, the base station or the platooning members may broadcast that the PDR is occupied to the outside. Therefore, step 7 may be performed after step 4 and before step 5 or step 6.

Scenario 2

Figure 7:
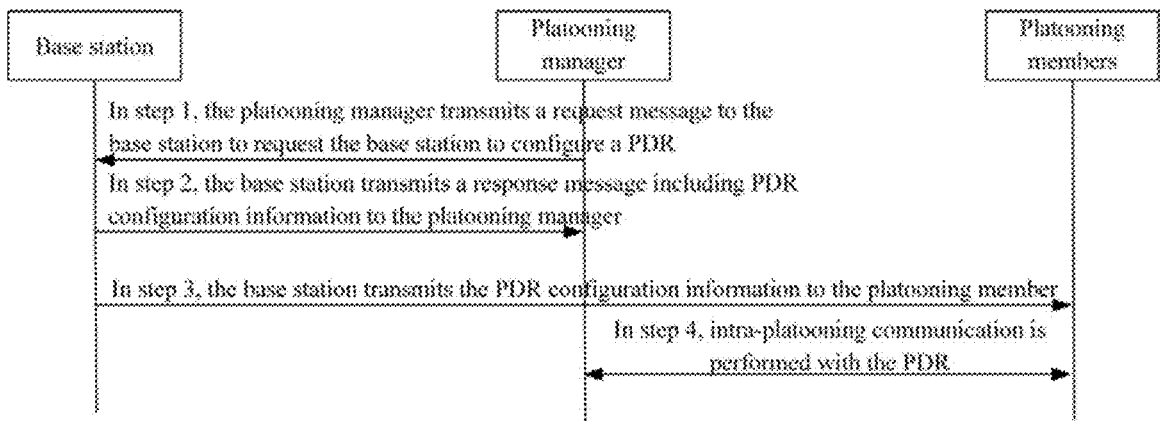
FIG. 7 is a flowchart illustrating a scenario 2 of a resource configuration method of a network side device according to an embodiment of the present disclosure.

FIG. 7 is a flowchart illustrating a scenario 2 of a resource configuration method of a network side device according to an embodiment of the present disclosure. As shown in FIG. 7, the network side device is embodied as the base station. The group is embodied as a platooning.

The resource member is disposed at a leading position of the platooning.

A specific implementation flow is described below.

In step 1, a platooning manager transmits a request message to the base station through the Uu interface to request the base station to configure the PDR for the platooning.

In step 2, the base station transmits a response message to the platooning manager through the Uu interface.

In step 3, the base station transmits the PDR configuration information to the platooning members through the Uu interface (the platooning members include the platooning manager and the other platooning member).

In step 4, the platooning manager and the other platooning member acquire the PDR configuration information, and then perform intra-platooning communication with the PDR.

In step 5, the base station or the platooning members broadcast that the configured PDR is occupied to the outside.

Scenario 3

Figure 8:
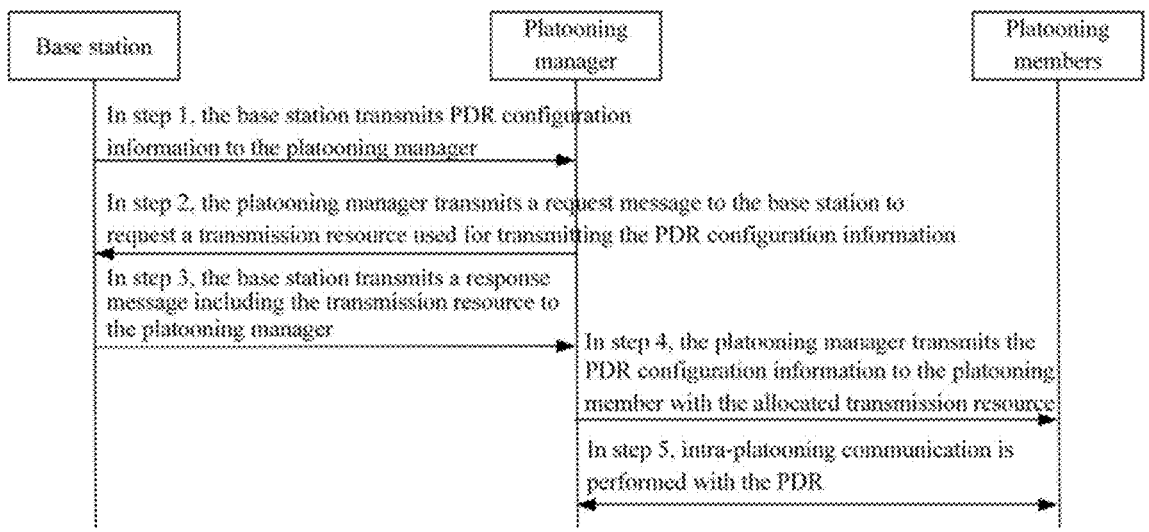
FIG. 8 is a flowchart illustrating a scenario 3 of a resource configuration method of a network side device according to an embodiment of the present disclosure.

FIG. 8 is a flowchart illustrating a scenario 3 of a resource configuration method of a network side device according to an embodiment of the present disclosure. As shown in FIG. 8, the network side device is embodied as the base station. The group is embodied as a platooning. The resource member is disposed at a leading position of the platooning.

In step 1, a platooning manager transmits a request message to the base station through the Uu interface to request the base station to configure the PDR for the platooning.

In step 2, the base station transmits a response message to the platooning manager through the Uu interface.

In step 3, the base station transmits the PDR configuration information to the platooning members through the Uu interface.

In step 4, the platooning manager and the other platooning member acquire the PDR configuration information, and then perform intra-platooning communication with the PDR (the platooning members include the platooning manager and the other platooning member).

In step 5, the network/the platooning manager/the platooning members broadcast that the PDR is occupied to the outside.

Scenario 4

Figure 9:
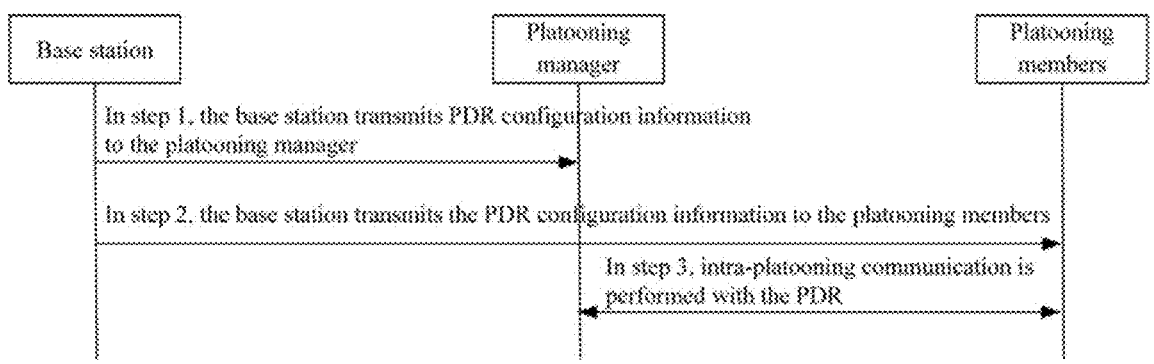
FIG. 9 is a flowchart illustrating a scenario 4 of a resource configuration method of a network side device according to an embodiment of the present disclosure.

FIG. 9 is a flowchart illustrating a scenario 4 of a resource configuration method of a network side device according to an embodiment of the present disclosure. As shown in FIG. 9, the network side device is embodied as the base station. The group is embodied as a platooning. The resource member is disposed at a leading position of the platooning.

In step 1, the base station directly transmits the PDR configuration information to a platooning manager through the Uu interface.

In step 2, the platooning manager requests a transmission resource from the base station through the Uu interface. The platooning manager forwards the PDR configuration information to the platooning members with the transmission resource.

In step 3, the other platooning member acquires the PDR configuration information, and then the platooning manager and the other platooning member in the platooning perform intra-platooning communication with the PDR.

In step 4, the base station or the platooning members broadcast that the configured PDR is occupied to the outside.

This embodiment solves the problem in the existing art of a significantly increased burden of signaling interactions between a network and a vehicle and a high delay of V2V communication between platooning members because a network dynamically allocates or schedules a resource, simplify a resource configuration between the platooning members and supports a mobility of the platooning members in different position areas.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the technical solution of the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to each embodiment of the present disclosure.

Embodiment 3

Figure 10:
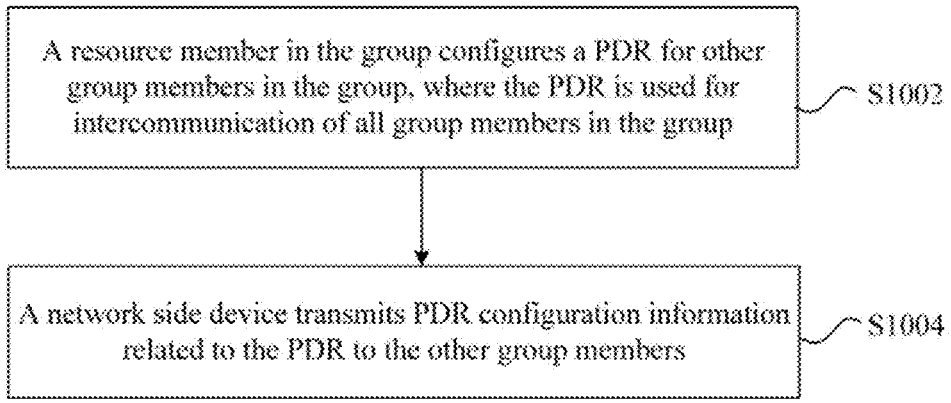
FIG. 10 is a flowchart of an intra-group resource configuration method according to an embodiment of the present disclosure.

This embodiment provides an intra-group resource configuration method. What has been described is not repeated herein. FIG. 10 is a flowchart of an intra-group resource configuration method according to an embodiment of the present disclosure. As shown in FIG. 10, the method includes steps described below.

In step S1002, a resource member in group configures a PDR for other group members in the group, where the PDR is used for intercommunication of all group members in the group.

In step S1004, the resource member transmits PDR configuration information related to the PDR to the other group members.

It is to be noted that in this embodiment, when the group member communicates with a network side device or other group members, the group member does not perform communication with the PDR. However, when the group member communicates with the other group member in the group, the group member performs communication with the PDR. In other words, the PDR is exclusively used for the communication between different group members in the same group.

It is to be noted that in this embodiment, if the group member cannot receive the PDR configured for the group member itself and the PDR configuration information transmitted to the group member itself, or cannot communicate with the other group members with the PDR, the group member will be considered to be not in the group.

In an embodiment, the resource member may be a manager which manages all the group members in the group, for example, a group member at a leading position of the group. Of course, a group member at the other position of the group may also be taken as the resource member. Optionally, the resource member configures the PDR for the group in the following manner: the resource member allocates the PDR to the group, or the resource member updates the PDR for the group.

In an embodiment, the resource member determines whether a group member is located out of a coverage range of the network side device. In response to determining that the group member is located out of the coverage range of the network side device, the resource member configures the PDR for and transmits the PDR configuration information to the other group members.

For the resource member, if the group member in the group is located out of the coverage range of the network side device, the network side device cannot directly configure the PDR for the group member and transmit the PDR configuration information to the group member. In this case, the resource member may replace the network side device to configure the PDR for and transmit the PDR configuration information to the other group members. Of course, it is to be noted that even if all the group members are located within the coverage range of the network side device, the resource member can perform the preceding operations for the other group members.

In an embodiment, when the resource member determines that the resource member is located within the coverage range of the network side device, the resource member transmits PDR request information to the network side device; the resource member receives the PDR and the PDR configuration information transmitted by the network side device according to the PDR request information; and the resource member configures the PDR transmitted by the network side device for the other group members and transmits the PDR configuration information transmitted by the network side device to the other group members.

In an embodiment, when the resource member determines that the resource member is located out of the coverage range of the network side device, the resource member determines whether a standby resource member in the group is located within the coverage range of the network side device, and in response to determining that the standby resource member is located within the coverage range of the network side device, the resource member instructs the standby resource member to replace the resource member as the resource member to configure the PDR for and transmit the PDR configuration information to the other group members; or the resource member configures the PDR of the resource member itself for the other group members and transmits the PDR configuration information of the resource member itself to the other group members.

For example, when a certain group member preforms the PDR update, and the PDR currently used by the certain group member is the PDR previously allocated by the resource member. Since the resource member is located out of the coverage range of the network side device, the resource member cannot transmits a configuration request for requesting the PDR to the network side device, and thus cannot update the PDR for the certain group member which requires an update. Therefore, the resource member needs to instruct the standby resource member located within the coverage range of the network side device to replace it to perform functions of the resource member, so as to update the PDR. If the standby resource member is not on the network side device, it proves that the PDR cannot be updated and the resource member instructs the group member which requires the update to stop updating the PDR until the resource member and/or the standby resource member enter into the coverage range of the network side device.

In an embodiment, the resource member receives a resource for carrying the PDR configuration information and configured by the network side device, and transmits the PDR configuration information to the other group members with the resource.

In an embodiment, the resource member allocates the PDR to the group according to group information and/or a preset configuration manner.

It is to be noted that the network side device allocates the PDR to the group, which means that the network side device allocates the corresponding PDR to the group members in the group which have not implemented intra-group communication with the PDR.

In an embodiment, group member information includes at least a number of group members, speed information of the group members and environment information of the group members; and a preset configuration manner is a manner for allocating the PDR and pre-determined by the group for the group members. For example, before the group is allocated with the PDR, it is determined that the resource member is allocated with more PDRs to monitor in real time a situation of the PDR of the other group member in the group.

In an embodiment, a condition for triggering the update performed by the resource member for the other group members includes at least one of conditions described below.

(1) The resource member detects that a position area where the group member is located is updated from a first area to a second area. For example, if the resource member detects that the group moves from a sparsely populated mountain road to a densely populated village, the resource member needs to allocate more PDRs to the group in the village for communication. Conversely, if the group member moves from the densely populated village to the sparsely populated mountain road, the resource member no longer needs to allocate more resources to the group member and reduces resources allocated to the group member to save resources.

(2) The resource member detects that the PDR which the group member needs to acquire reaches a preset acquisition threshold. For example, when the resource member detects that currently more than half of the group members in the group require more resources than an average quantity of required resources, the resource member determines that more PDRs need to be allocated to the group members. However, if more than half of the group members require fewer resources than the average quantity of required resources, the resource member determines that fewer PDRs need to be allocated to the group.

(3) The resource member detects that a quality value indicating a quality of the PDR of the group member is less than a preset quality threshold.

For example, the resource member detects that currently a value of a network signal of a position of the group member is −90 dbm which is less than a normal value range (generally from −40 dbm to −60 dbm). In this case, the resource member needs to allocate more PDRs to the group ensure the normal communication between group members in the group.

It is to be noted that in a practical update scenario, the resource member needs to comprehensively consider the group member information and the environment information instead of considering a single condition.

Optionally, the PDR configuration information includes at least one of: a resource position of the PDR, a resource size of the PDR, a resource duration of the PDR or a resource starting time of the PDR.

In an embodiment, to prevent the resource from being used by a network or the other group members not in the group, after the resource member transmits the PDR to the group members, the resource member instructs the group members to broadcast a resource situation of the configured PDR.

In an embodiment, this embodiment further provides a scenario below to facilitate the understanding of the technical solution described in this embodiment.

Scenario 1

Figure 11:
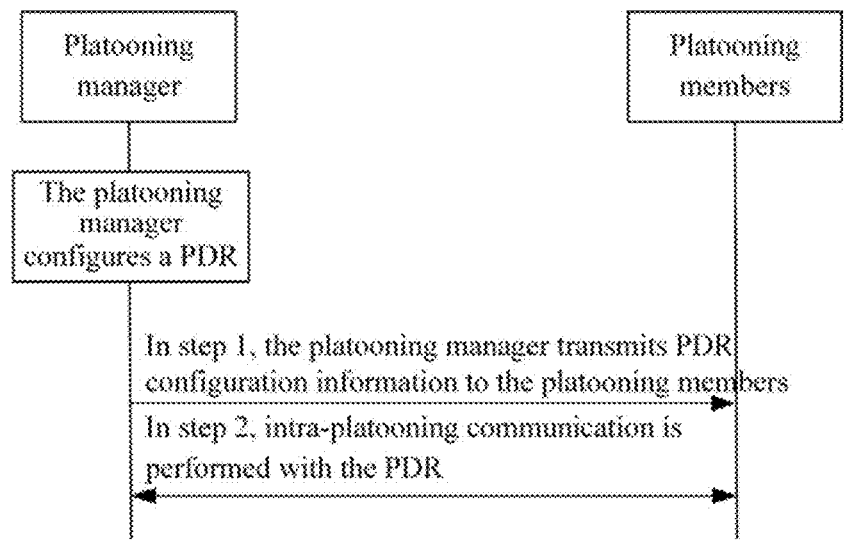
FIG. 11 is a flowchart illustrating a scenario 1 of an intra-group resource configuration method according to an embodiment of the present disclosure.

FIG. 11 is a flowchart illustrating a scenario 1 of an intra-group resource configuration method according to an embodiment of the present disclosure. As shown in FIG. 11, the group is embodied as a platooning. The resource member is disposed at a leading position of the platooning.

In step 1, after configuring the PDR, a platooning manager transmits the PDR configuration information to the other platooning manager in the platooning.

In step 2, the other platooning member acquires the PDR configuration information, and then the platooning manager and the other platooning member in the platooning perform intra-platooning communication with the PDR.

In step 3, a base station and/or the platooning members broadcast that the configured PDR is occupied to the outside.

This embodiment solves the problem in the existing art of a significantly increased burden of signaling interactions between a network and a vehicle and a high delay of V2V communication between platooning members because a network dynamically allocates or schedules a resource, simplify a resource configuration between the platooning members and supports a mobility of the platooning members in different position areas.

From the description of the embodiment described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the technical solution of the present disclosure substantially, or the part contributing to the existing art, may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device or the like) to execute the method according to each embodiment of the present disclosure.

Embodiment 4

This embodiment further provides an intra-group communication apparatus. The apparatus is configured to implement the above-mentioned embodiments and specific embodiments. What has been described is not repeated herein. As used below, a term "module" may be software, hardware or a combination thereof capable of implementing predetermined functions. The apparatus in the embodiment described below is preferably implemented by software, but implementation by hardware or by a combination of software and hardware is also possible and conceived.

Figure 12:
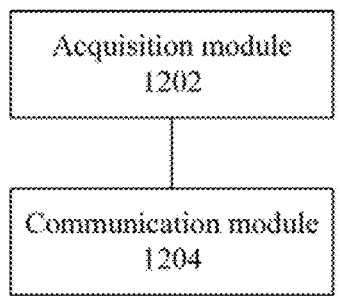
FIG. 12 is a structural diagram of an intra-group communication apparatus according to an embodiment of the present disclosure.

FIG. 12 is a structural diagram of an intra-group communication apparatus according to an embodiment of the present disclosure. As shown in FIG. 12, the apparatus includes an acquisition module 1202 and a communication module 1204.

The acquisition module 1202 is configured to acquire a PDR, where the PDR is used for intercommunication of all group members in the group.

The communication module 1204 is configured to perform the intercommunication after PDR configuration information related to the PDR is acquired.

In an embodiment, when one of the group members is located within a coverage range of a network side device or a resource member in the group is located within the coverage range of the network side device, the acquisition module 1202 is further configured to acquire the PDR and the PDR configuration information transmitted by the network side device and/or the resource member in the group. When the resource member is located out of the coverage range of the network side device or all the group members are located out of the coverage range of the network side device, the acquisition module 1202 is further configured to acquire the PDR and the PDR configuration information transmitted by the resource member. The resource member is a group member in the group which is configured to transmit a configuration request for requesting the PDR and a configuration request for requesting the PDR configuration information to the network side device and configure the PDR for and transmit the PDR configuration information to the other group members in the group.

It is to be noted that the intra-group communication apparatus in the embodiment described above has the same concept as the intra-group communication method embodiment, and a specific implementation process refers to that in the method embodiment, which is not repeated herein.

Embodiment 5

Figure 13:
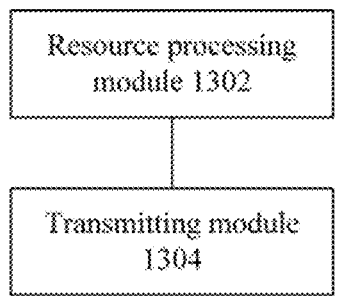
FIG. 13 is a structural diagram of a resource configuration apparatus according to an embodiment of the present disclosure.

This embodiment further provides a resource configuration apparatus disposed in a network side device. The apparatus is configured to implement the above-mentioned embodiments and specific embodiments. What has been described is not repeated herein. As used below, the term "module" may be software, hardware or a combination thereof capable of implementing predetermined functions. The apparatus in the embodiment described below is pref- FIG. 13 is a structural diagram of a resource configuration apparatus according to an embodiment of the present disclosure. As shown in FIG. 13, the apparatus includes a resource processing module 1302 and a transmitting module 1304.

The resource processing module 1302 is configured to configure a PDR for group members in group, where the PDR is used for intercommunication of all group members in the group.

The transmitting module 1304 is configured to transmit PDR configuration information related to the PDR to the group members.

In an embodiment, the resource processing module 1302 is further configured to actively configure the PDR for and transmit the PDR configuration information to the group; or receive a configuration request transmitted by a resource member in the group and configure the PDR for and transmit the PDR configuration information to the group members in response to the configuration request. The resource member is a group member in the group capable of transmitting the configuration request to the network side device and configuring the PDR for and transmitting the PDR configuration information to the other group members in the group.

In an embodiment, the apparatus further includes a determining module. The determining module is configured to determine whether the resource member is located within a coverage range of the network side device; and in response to determining that the resource member is located within the coverage range of the network side device, trigger the transmitting module 1304 to transmit the PDR and the PDR configuration information to the resource member.

In an embodiment, the apparatus further includes a broadcast module. The broadcast module is configured to broadcast a resource situation of the configured PDR, or instruct the group members to broadcast the resource situation of the configured PDR.

It is to be noted that the resource configuration apparatus in the embodiment described above has the same concept as the resource configuration method embodiment, and a specific implementation process refers to that in the method embodiment, which is not repeated herein.

Embodiment 6

Figure 14:
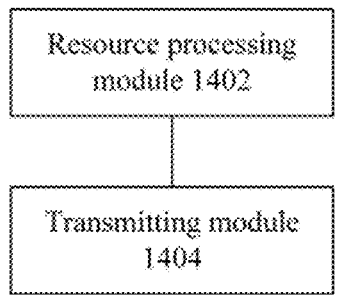
FIG. 14 is a structural diagram of a resource configuration apparatus according to an embodiment of the present disclosure.

FIG. 14 is a structural diagram of a resource configuration apparatus according to an embodiment of the present disclosure. As shown in FIG. 14, the apparatus includes a resource processing module 1402 and a transmitting module 1404.

The resource processing module 1402 is configured to configure a PDR for the other group members in the group, where the PDR is used for intercommunication of all group members in the group.

The transmitting module 1404 is configured to transmit PDR configuration information related to the PDR to the other group members.

In an embodiment, the apparatus further includes a determining module. The determining module is configured to determine whether a group member is located out of a coverage range of a network side device; and in response to determining that the group member located out of the coverage range of the network side device, trigger the transmitting module 1404 to configure the PDR for and transmit the PDR configuration information to the other group members.

In an embodiment, the apparatus further includes a request module, a receiving module and a forwarding module. The request module is configured to transmit PDR request information to the network side device. The receiving module is configured to receive the PDR and the PDR configuration information transmitted by the network side device according to the PDR request information. The forwarding module is configured to configure the PDR transmitted by the network side device for the other group members and transmit the PDR configuration information transmitted by the network side device to the other group members.

In an embodiment, the resource processing module 1402 is further configured to allocate the PDR to the group members according to group information and/or a preset configuration manner.

In an embodiment, the apparatus further includes a broadcast module. The broadcast module is configured to instruct the group members to broadcast a resource situation of the configured PDR.

It is to be noted that the resource configuration apparatus in the embodiment described above has the same concept as the resource configuration method embodiment, and a specific implementation process refers to that in the method embodiment, which is not repeated herein.

Embodiment 7

Figure 15:
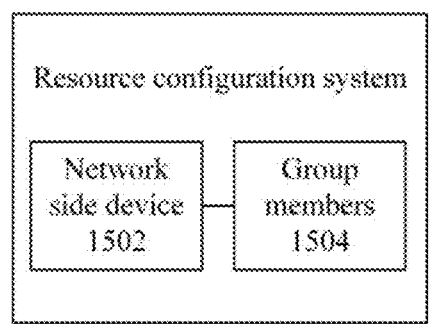
FIG. 15 is a structural diagram of a resource configuration system according to an embodiment of the present disclosure.

This embodiment further provides a resource configuration system. FIG. 15 is a structural diagram of a resource configuration system for a network side device according to an embodiment of the present disclosure. As shown in FIG. 15, the system includes a network side device 1502 and group members 1504.

The network side device 1502 is configured to configure a PDR for the group members in the group, and transmit PDR configuration information related to the PDR to the group members; where the PDR is used for intercommunication of all group members in the group.

The group members 1504 are configured to receive the PDR and the PDR configuration information configured by the network side device.

In an embodiment, the network side device 1502 and the group members 1504 both have a corresponding Uu interface. Therefore, when implement the preceding functions, the network side device 1502 transmits the PDR and the PDR configuration information together to a corresponding receive port of the group members 1404 through the Uu interface after a processor of the network side device 1502 processes the PDR required to be configured for the group members 1504. Meanwhile, a processor in the group members 1504 acquires and processes the PDR and the PDR configuration information received by the receive port, and transmits a processing interface to a corresponding communication device (such as an antenna) to communicate with the other group members 1504 in the group.

Embodiment 8

Figure 16:
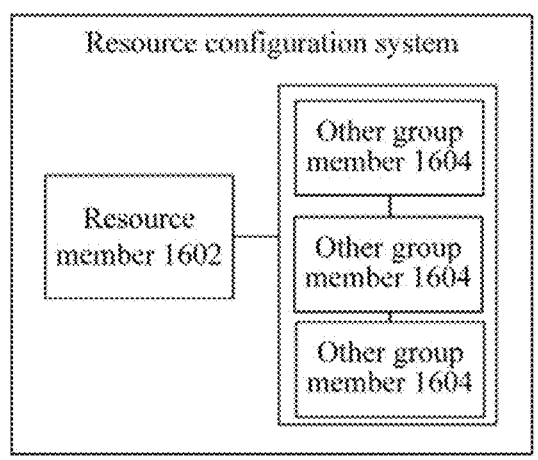
FIG. 16 is a structural diagram of a resource configuration system according to an embodiment of the present disclosure.

This embodiment further provides a resource configuration system. FIG. 16 is a structural diagram of an intra-group resource configuration system according to an embodiment of the present disclosure. As shown in FIG. 16, the system includes a resource member 1602 and the other group members 1604.

The resource member 1602 in group is configured to configure a PDR for the other group members 1604 in the group, and transmit PDR configuration information related to the PDR to the other group members 1604; where the PDR is used for intercommunication of all group members in the group.

The other group members 1604 in the group are configured to receive the PDR configured by the resource member 1602 and the PDR configuration information transmitted by the resource member 1602.

In an embodiment, the resource member 1602 and the other group members 1604 in the group both have the corresponding transmission interface and receiving interface. Therefore, when implementing the preceding functions, the resource member 1602 transmits the PDR and the PDR configuration information together to a corresponding receive port of the other group members 1604 in the group through the transmission interface after a processor of the resource member 1602 processes the PDR required to be configured for each of the other group members 1604 in the group. Meanwhile, a processor in the other group members 1604 in the group acquires and processes the PDR and the PDR configuration information received by the receive port, and transmits a processing interface to a corresponding communication device (such as an antenna) to communicate with the group members.

Embodiment 9

Another embodiment of the present disclosure further provides a storage medium. The storage medium is configured to store program codes for executing steps described below.

In S1, group members in the group acquire a PDR, where the PDR is used for intercommunication of all group members in the group.

In S2, the group members perform the intercommunication after acquiring PDR configuration information related to the PDR.

In an embodiment, the storage medium in this embodiment may include, but is not limited to, a USB flash disk, a ROM, a RAM, a mobile hard disk, a magnetic disk, an optical disk or another medium capable of storing the program codes.

In an embodiment, for specific examples in this embodiment, reference may be made to the examples described in the embodiments and specific embodiments described above, and repetition will not be made in this embodiment.

Embodiment 10

Another embodiment of the present disclosure further provides a storage medium. The storage medium is configured to store program codes for executing steps described below.

In S1, a network side device configures a PDR for group members in the group, where the PDR is used for intercommunication of all group members in the group. In S2, the network side device transmits PDR configuration information related to the PDR to the group members.

In an embodiment, the storage medium in this embodiment may include, but is not limited to, a USB flash disk, a ROM, a RAM, a mobile hard disk, a magnetic disk, an optical disk or another medium capable of storing the program codes.

Embodiment 11

Another embodiment of the present disclosure further provides a storage medium. The storage medium is configured to store program codes for executing steps described below.

In S1, a resource member in the group configures a PDR for the other group members in the group, where the PDR is used for intercommunication of all group members in the group. In S2, the resource member transmits PDR configuration information related to the PDR to the other group members.

In an embodiment, the storage medium in this embodiment may include, but is not limited to, a USB flash disk, a ROM, a RAM, a mobile hard disk, a magnetic disk, an optical disk or another medium capable of storing the program codes.

Embodiment 12

Another embodiment of the present disclosure further provides a processor. The processor is configured to execute program codes of steps described below.

In S1, group members in the group acquire a PDR, where the PDR is used for intercommunication of all group members in the group.

In S2, the group members perform the intercommunication after acquiring PDR configuration information related to the PDR.

In an embodiment, for specific examples in this embodiment, reference may be made to the examples described in the embodiments and optional embodiments described above, and repetition will not be made in this embodiment.

Embodiment 13

Another embodiment of the present disclosure further provides a processor. The processor is configured to execute program codes of steps described below.

In S1, a network side device configures a PDR for group members in the group, where the PDR is used for intercommunication of all group members in the group.

In S2, the network side device transmits PDR configuration information related to the PDR to the group members.

Embodiment 14

Another embodiment of the present disclosure further provides a processor. The processor is configured to execute program codes of steps described below.

In S1, a resource member in the group configures a PDR for the other group members in the group, where the PDR is used for intercommunication of all group members in the group.

In S2, the resource member transmits PDR configuration information related to the PDR to the other group members.

In an embodiment, for specific examples in this embodiment, reference may be made to the examples described in the embodiments and optional embodiments described above, and repetition will not be made in this embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

INDUSTRIAL APPLICABILITY

When the solutions provided by the embodiments of the present disclosure are used, in the V2V communication, the network side device or the resource member in the group configures the PDR used for intra-group communication for the group members in the group and transmits attribute information capable of indicating the PDR to the group members configured with the PDR. Therefore, the present disclosure may solve the problem in the existing art of the significantly increased burden of signaling interactions between the network and the vehicle and the high delay of the V2V communication between platooning members because the network dynamically allocates or schedules the resource, simplify the resource configuration between the platooning members and supports the mobility of the platooning members in different position areas.

What is claimed is:

1. An intra-group communication method, comprising:
acquiring, by group members in a group, a platooning dedicated resource (PDR), wherein the PDR is used for intercommunication of all members in the group; and
performing, by the group members, the intercommunication after acquiring PDR configuration information related to the PDR, wherein the all members comprise the group members;
the method further comprising:
on condition that the group members are located within a coverage range of a network side device or a resource member in the group is located within the coverage range of the network side device, acquiring, by the group members, the PDR transmitted by at least one of the network side device or the resource member; or
on condition that a resource member is located out of a coverage range of a network side device or the all members are located out of the coverage range of the network side device, acquiring, by the group members, the PDR transmitted by the resource member;
wherein the resource member is one of the all members in the group which is configured to transmit to the network side device a configuration request for requesting the PDR and configure the PDR for the group members in the group.

2. The method of claim 1, wherein the acquiring the PDR configuration information comprises:
on condition that the group members are located within the coverage range of the network side device or the resource member is located within the coverage range of the network side device, acquiring, by the group members, the PDR configuration information transmitted by at least one of the network side device or the resource member in the group; or
on condition that the resource member is located out of the coverage range of the network side device or the all members are located out of the coverage range of the network side device, acquiring, by the group members, the PDR configuration information transmitted by the resource member;
wherein the resource member is further configured to transmit to the network side device a configuration request for requesting the PDR configuration information and transmit the PDR configuration information to the group members in the group.

3. The method of claim 1, wherein the PDR configuration information comprises at least one of: a resource position of the PDR, a resource size of the PDR, a resource duration of the PDR or a resource starting time of the PDR.

4. A resource configuration method of a network side device, comprising:
configuring, by the network side device, a platooning dedicated resource (PDR) for group members in a group, wherein the PDR is used for intercommunication of all members in the group; and
transmitting, by the network side device, PDR configuration information related to the PDR to the group members;
the method further comprising:
determining, by the network side device, whether a resource member is located within a coverage range of the network side device; and in response to determining that the resource member is located within the coverage range of the network side device, transmitting, by the network side device, the PDR and the PDR configuration information to the resource member;
wherein the resource member is one of the all members in the group capable of transmitting the configuration request to the network side device and configuring the PDR for and transmitting the PDR configuration information to the group members in the group.

5. The method of claim 4, wherein
the network side device actively configures the PDR for the group and transmits the PDR configuration information to the group; or
the network side device receives a configuration request transmitted by the resource member in the group and configures, in response to the configuration request, the PDR for the group members and transmits the PDR configuration information to the group members.

6. The method of claim 4, further comprising:
in response to determining that the resource member is located out of the coverage range of the network side device, cancelling, by the network side device, a transmission of the PDR and the PDR configuration information to the resource member; or
in response to determining that the resource member is located out of the coverage range of the network side device, determining, by the network side device, whether a backup resource member preset in the group is located within the coverage range of the network side device; and in response to determining that the backup resource member is located within the coverage range of the network side device, transmitting, by the network side device, the PDR and the PDR configuration information to the backup resource member.

7. The method of claim 4, wherein the network side device configures the PDR for the group members through updating, wherein a condition for triggering the updating comprises at least one of following manners:
  the network side device detects that a position area where the group members are located is updated from a first area to a second area;
  the network side device detects that a quality value indicating a quality of the PDR of the group members is less than a preset quality threshold; or
  the network side device acquires group member information and environment information reported by the group members and determines that the group member information and the environment information satisfy a preset trigger condition.

8. An intra-group resource configuration method, comprising:
  configuring, by a resource member in a group, a platooning dedicated resource (PDR) for group members in the group, wherein the PDR is used for intercommunication of all members in the group; and
  transmitting, by the resource member, PDR configuration information related to the PDR to the group members;
  on condition that the resource member determines that the resource member is located within a coverage range of a network side device, the method further comprising:
  transmitting, by the resource member, PDR request information to the network side device;
  receiving, by the resource member, the PDR and the PDR configuration information transmitted by the network side device according to the PDR request information; and
  configuring, by the resource member, the PDR transmitted by the network side device for the group members and transmitting the PDR configuration information transmitted by the network side device to the group members;
  on condition that the resource member determines that the resource member is located out of a coverage range of a network side device, the method further comprising:
  determining, by the resource member, whether a backup resource member in the group is located within the coverage range of the network side device; and in response to determining that the backup resource member is located within the coverage range of the network side device, instructing, by the resource member, the backup resource member to replace the resource member as the resource member to configure the PDR for and transmit the PDR configuration information to the group members; or
  configuring, by the resource member, the PDR of the resource member for the group members and transmitting the PDR configuration information of the resource member to the group members.

9. The method of claim 8, wherein before configuring, by the resource member, the PDR for the group members, the method further comprises:
  determining, by the resource member, whether a group member in the group is located out of the coverage range of the network side device; and
  in response to determining that the group member in the group is located out of the coverage range of the network side device, configuring, by the resource member, the PDR for the group members, and transmitting by the resource member, the PDR configuration information to the group members.

10. The method of claim 8, wherein the configuring, by the resource member, the PDR for the group members further comprises:
  allocating, by the resource member, the PDR to the group members; or
  updating, by the resource member, the PDR for the group members.

11. The method of claim 10, wherein on condition that the resource member allocates the PDR to the group members, the method comprises:
  allocating, by the resource member, the PDR to the group members according to at least one of group member information or a preset configuration manner.

12. The method of claim 11, wherein
  the group member information comprises at least: a number of the group members, speed information of the group members and environment information of the group members; and
  a preset configuration manner is a manner for allocating the PDR which is pre-determined by the group for the group members.

13. The method of claim 10, wherein a condition for triggering the updating comprises at least one of following manners:
  the resource member detects that a position area where the group members are located is updated from a first area to a second area;
  the resource member detects that the PDR which the group members need to acquire reaches a preset acquisition threshold; or the resource member detects that a quality value indicating a quality of the PDR of the group members is less than a preset quality threshold.

14. An intra-group communication apparatus, comprising: a memory for storing executable instructions and a processor; wherein the processor is configured to, when executing the executable instructions, perform the method of claim 1.

15. A resource configuration apparatus, disposed in a network side device, comprising: a memory for storing executable instructions and a processor; wherein the processor is configured to, when executing the executable instructions, perform the method of claim 4.

16. A resource configuration apparatus, disposed in a resource member in a group, comprising: a memory for storing executable instructions and a processor; wherein the processor is configured to, when executing the executable instructions, perform the method of claim 8.

* * * * *

UNITED STATES PATENT AND TRADEMARK OFFICE
CERTIFICATE OF CORRECTION

PATENT NO. : 11,178,516 B2
APPLICATION NO. : 16/496906
DATED : November 16, 2021
INVENTOR(S) : Ma et al.

It is certified that error appears in the above-identified patent and that said Letters Patent is hereby corrected as shown below:

In the Specification

In Column 10, Line 10, before "group" delete "other".

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*